United States Patent

Siggel et al.

[15] 3,682,929
[45] Aug. 8, 1972

[54] AROMATIC BIS-(2,4-DIHYDROXYPYRIDINE) COMPOUNDS

[72] Inventors: Erhard Siggel, Seckmauern; Hilde Kersten, Mechenhard; Gerhard Meyer, Obernburg, all of Germany

[73] Assignee: Glanzstoff AG, Wuppertal, Germany

[22] Filed: Jan. 3, 1969

[21] Appl. No.: 788,932

[30] Foreign Application Priority Data

Jan. 8, 1968 Germany..........P 16 95 107.8

[52] U.S. Cl............260/288 R, 260/47, 260/283 BI, 260/283 S, 260/283 SY, 260/475 SC
[51] Int. Cl..............................................C07d 33/42
[58] Field of Search..............................260/279, 288

[56] References Cited

UNITED STATES PATENTS

| | | | |
|---|---|---|---|
| 3,577,387 | 4/1971 | Kersten | 260/47 |
| 2,228,166 | 1/1941 | Jensch | 260/288 |
| 2,430,679 | 11/1947 | Jenkins | 260/283 S |
| 2,552,263 | 5/1951 | Dickey | 260/288 |
| 2,652,396 | 9/1953 | Keyes et al. | 260/240.1 |
| 3,164,599 | 1/1965 | Rapoport | 260/288 |
| 3,257,405 | 6/1966 | Gerson | 260/279 |
| 3,284,454 | 11/1966 | Haring | 260/279 |
| 3,334,102 | 8/1967 | Aldridge et al. | 260/288 |
| 3,342,823 | 9/1967 | Dien | 260/279 |
| 3,449,056 | 6/1969 | Pum | 260/288 |
| 3,483,179 | 12/1969 | Braun | 260/289 |

OTHER PUBLICATIONS

Kersten, in 886 O.G. 106 (1971)
Sivaramakrishnan et al., Jour. Sci. Ind. Research (India) Vol. 18(B), p. 496 (1959)
Patel et al., Jour. Sci. Ind. Research (India), Vol. 19B, p. 436– 438 (1960)
Mentzer et al., Chem. Abstr., Vol. 38, Col. 6337 (1944)

*Primary Examiner*—Donald G. Daus
*Attorney*—Johnston, Root, O'Keeffe, Keil, Thompson & Shurtleff

[57] ABSTRACT

A condensed aromatic bis-(2,4-dihydroxypyridine) of the formula

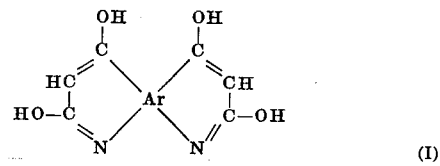

(I)

wherein Ar represents a tetravalent aromatic radical such as phenylene, diphenylene, naphthylene, diphenyl ether, diphenyl methane and the like, and a process for producing these compounds by reacting an aryl diamidomalonic acid dialkyl ester with polyphosphoric acid at an elevated temperature and subsequently precipitating the reaction product.

4 Claims, No Drawings

AROMATIC BIS-(2,4-DIHYDROXYPYRIDINE) COMPOUNDS

A number of syntheses for the preparation of 2,4-dihydroxyquinoline

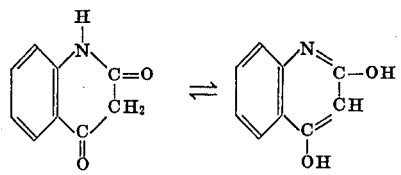

are known from the literature, in accordance with reactions which have been carried out by E. Ziegler and his co-workers among others. In one of these processes, malonic acid dianilide is heated in the presence of aluminum chloride to about 300° C. and then the 2-hydroxy 4-phenylquinoline which has been formed is hydrolyzed using hydrochloric acid under pressure to form the 2,4-dihydroxyquinoline product.

According to another process, malonic acid ester anilide is reacted with polyphosphoric acid in a ratio of about 1:10 at 170° C.

A reaction for the preparation of 2,4-dihydroxyquinoline is also carried out by using malonic acid dianilide or malonic acid monoanilide and polyphosphoric acid. In these reactions, the relative proportions of the malonic acid compound to polyphosphoric acid is about 1:7 and the reaction temperature is between 100° and 150° C.

The preparation of compounds which contain two 2,4-dihydroxypyridine rings condensed with one or more aromatic rings has not as yet been carried out. The preparation of such novel compounds is the object of the present invention.

It has now been found, in accordance with the invention, that one can obtain novel and useful bis-(2,4-dihydroxypyridine) derivatives of the formula:

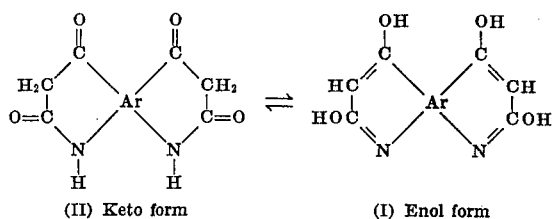

in which Ar represents one of the following aromatic groups:

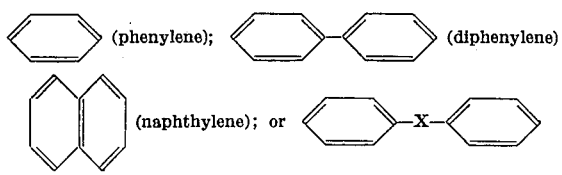

in which X represents alkylene of one to six carbon atoms or a keto group or an oxygen or sulfur atom. These novel compounds are readily obtained in good yields by reacting an aryl diamidomalonic acid dialkyl ester, in which the aryl group is the same as the groups given above for Ar and the alkyl groups are lower alkyl, e.g. of 1–4 carbon atoms, with polyphosphoric acid using a ratio by weight of the ester: acid of about 1:0.25 to 1:20 and preferably 1:0.25 to 1:5 and a reaction temperature of 130°–300° C. and preferably 180°–300° C., and then precipitating the reaction product with water. The product is preferably precipitated with iced water. The product is then easily separated or isolated from the reaction mixture in relatively pure form.

The aryl diamidomalonic acid dialkyl esters employed as the ester reactant are obtained in known manner by reaction of a malonic acid ester with an aromatic diamine. As aryl diamidomalonic acid dialkyl esters, it is preferred to use the reaction products of malonic acid lower alkyl esters with phenylene diamine, benzidine, diphenylether diamine, diphenylmethane diamine and naphthalene diamine. The alkyl ester groups of the diaryl diamidomalonic acid dialkyl ester are preferably methyl or ethyl esters. In those diamines with two aromatic rings, the amino groups can be on one ring or on two different rings. As a result, the new compounds (I) may also have the 2,4-dihydroxypyridine ring condensed on the same aromatic ring or on two different aromatic rings and the formula of the new compounds is thus intended to include positional isomers. In order to provide the pyridine structure, it will be apparent that two adjacent carbon atoms of at least one of the aromatic rings designated by Ar must be included in the pyridine ring and each pyridine ring is preferably separated by at least one carbon atom in the remaining aromatic structure.

Throughout most of this specification and in the accompanying claims, the new compounds are referred to as bis-(2,4-dihydroxypyridine) derivatives corresponding to formula (I). However, it will be recognized that such compounds may exist in either their enol form (I) or their keto form (II), i.e. they are equivalent tautomers, and both forms are inherently included within the formula of either compound. By identifying the novel compounds only in their enol form, it is possible to avoid reciting both structures at every point in the specification and claims. At the same time, the claims are intended to include both the enol and keto forms of the same compound.

The relative proportions by weight of the aryl diamido-malonic acid dialkyl ester and polyphosphoric acid in the process of the invention can be varied within the limits of from 1:0.25 to 1:20. However, it is especially desirable to use relatively small quantities of polyphosphoric acid in order to reduce costs, e.g. an ester:acid weight ratio of 1:0.25 to 1:5. When the precipitation of the reaction product is conducted with iced water, the polyphosphoric acid is highly diluted and cannot be recovered by conventional rectification methods. In these cases, i.e., when using small quantities of phosphoric acid, it is advisable to use reaction temperatures which are higher than 200° C., preferably about 200° to 250° C.

The reaction is generally completed after about 30 minutes. The reaction mass is then allowed to cool and the reaction product is precipitated with iced water. The products can be easily filtered and may be subsequently washed with water for purification purposes. The reactions take place with very good yields from 90 percent up to 100 percent of the theoretical yield.

The aromatic bis-(2,4-dihydroxypyridine) derivatives condensed according to the invention are valuable starting materials for the production of dyestuffs. The new compounds are also useful for producing valuable polymers which are infusible, solvent-insoluble and stable at high temperatures.

The invention is further illustrated by the following examples:

EXAMPLE 1

One drop of polyphosphoric acid (approx. 3 grams) is added to 10.7 grams of 4,4'-diphenylether diamidomalonic acid diethyl ester, the resulting mixture being melted with stirring and heated for 30 minutes at 230° C. The reaction takes place with considerable foaming. After cooling, iced water is added to the reaction product and the bis-(2,4-dihydroxy-6-quinoline) ether which has formed is filtered off and is thoroughly washed with water. After drying, 7.9 grams (94 percent of the theoretical yield) of a practically colorless, alkali- soluble substance is obtained, which does not melt at temperatures of up to 350° C. It can be recrystallized from dimethylformamide. The comparison of the infra-red spectra of the malonic acid ester starting material with those of the reaction product shows a disappearance of the amide bands at 3,290 and 1,550 cm$^{-1}$, and also of the CO-ester band at 1,744 cm$^{-1}$.

EXAMPLE 2

As in Example 1, 10.6 grams of 4,4'-diphenylmethane diamidomalonic acid diethyl ester are heated with about 3 grams of polyphosphoric acid for 30 minutes at 230° C. On adding iced water, 8.3 grams (96 percent of the theoretical yield) of bis-(2,4-dihydroxy-6-quinoline) methane can be obtained by filtration. This is a practically colorless, alkali-soluble substance. The disappearance of the amide and ester bands is again confirmed on comparison of the infra-red spectra of the starting material and the final product.

EXAMPLE 3

103 grams of diphenyl diamidomalonic acid diethyl ester are dissolved in 350 grams of polyphosphoric acid and heated for 30 minutes at 180° C. The reaction mixture is then allowed to cool in air and is then poured onto ice. It is left standing for some time and the precipitated bis-(2,4-dihydroxy-6-quinoline) which has precipitated is filtered using suction, washed with water and dried. The product is again alkali-soluble. The yield is 95 percent of the theoretical. On comparison of the infra-red spectra of the malonic acid ester starting material with the final product, the disappearance of the amide and ester bands is again observed.

EXAMPLE 4

Four grams of naphthalene-1,8-diamidodimalonic acid diethyl ester are heated with 10 grams of polyphosphoric acid for 30 minutes at 230° C. After cooling the solution, the mixture is poured onto iced water and the precipitate is filtered using suction. A 90 percent of yield of 2,4,9,11-tetrahydroxyquino-(7,8-h)-quinoline is obtained, which can be recrystallized from dimethylformamide. The melting point is above 300° C. The infra-red spectrum shows no ester band at 1,730 cm$^{-1}$ and no amide bands at 3,290 and 1,550 cm$^{-1}$.

EXAMPLE 5

Ten grams of phenylene-1,4-diamido-dimalonic acid diethyl ester are heated with 20 grams of polyphosphoric acid for 30 minutes at 250° C. After cooling the solution, the mixture is poured into iced water and the precipitate is filtered off using suction. 6.6 grams (91 percent of the theoretical yield) of 2,4,7,9-tetrahydroxypyrido-(2,3-g)-quinoline is obtained. The compound can be recrystallized from dimethylformamide and does not show in the infra-red spectrum any ester band at 1,730 cm$^{-1}$ or any amide bands at 3,290 and 1,550 cm$^{-1}$.

The new compounds of the formula (I) or as represented by their keto form (II) are particularly useful when subjected to a series of steps including chlorination, alkoxylation, decarboxylation and finally polymerization to form polymers in which the recurring units are characterized by the tetravalent aromatic radical Ar connected in a chain by intermediate or alternate cyclic groups of the formula

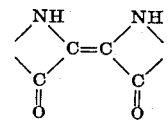

i.e. to provide a polymer with the recurring units

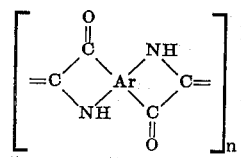

in which $n$ is preferably a large whole integer. These polymers are very stable up to temperatures of about 500° C. and are infusible, solvent-insoluble products having a wide variety of uses where such properties offer a high degree of stability against the attack of heat or chemicals. The preparation of these polymers is fully disclosed in our copending U.S. application Ser. No. 788,931 filed Jan. 3, 1969, now U.S. Pat. No. 3,577,387. granted May 4, 1971, the disclosure of which is incorporated herein by reference as fully as if set forth in its entirety.

The invention is hereby claimed as follows:

1. A condensed bis-(2,4-dihydroxypyridine) compound of the formula:

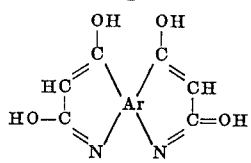

wherein Ar is a tetravalent aromatic group selected from the class consisting of diphenylene and

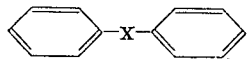

in which X is a member selected from the group consisting of alkylene of one to six carbon atoms and oxygen, each of the pyridine rings being completed by two adjacent carbon atoms of said aromatic group Ar.

2. Bis-(2,4-dihydroxy-6-quinoline) ether.
3. Bis-(2,4-dihydroxy-6-quinoline) methane.
4. Bis-(2,4-dihydroxy-6-quinoline).

* * * * *